(12) United States Patent
Hartung et al.

(10) Patent No.: US 7,266,668 B2
(45) Date of Patent: Sep. 4, 2007

(54) METHOD AND SYSTEM FOR ACCESSING A PLURALITY OF STORAGE DEVICES

(75) Inventors: Steven Fredrick Hartung, Boulder, CO (US); Chris T. Santilli, Colorado Springs, CO (US)

(73) Assignee: Copan Systems Inc., Longmont, CO (US)

( * ) Notice: Subject to any disclaimer, the term of this patent is extended or adjusted under 35 U.S.C. 154(b) by 480 days.

(21) Appl. No.: 10/996,086

(22) Filed: Nov. 22, 2004

(65) Prior Publication Data

US 2005/0114598 A1    May 26, 2005

Related U.S. Application Data

(60) Provisional application No. 60/524,678, filed on Nov. 24, 2003.

(51) Int. Cl.
*G06F 12/08* (2006.01)
(52) U.S. Cl. ............... 711/202; 711/4; 711/114; 711/154; 711/157; 711/203; 703/23; 709/231
(58) Field of Classification Search ............. 711/202, 711/4, 114, 154, 203, 157; 703/23; 709/231
See application file for complete search history.

(56) References Cited

U.S. PATENT DOCUMENTS

| 4,467,421 | A | * | 8/1984 | White ................... 711/118 |
| 5,438,674 | A | * | 8/1995 | Keele et al. ................ 711/4 |
| 5,805,864 | A | * | 9/1998 | Carlson et al. ............ 703/24 |
| 6,128,698 | A |   | 10/2000 | Georgis |
| 6,957,291 | B2 | * | 10/2005 | Moon et al. .............. 710/302 |
| 2002/0144044 | A1 | * | 10/2002 | Moon et al. .............. 710/302 |
| 2004/0006702 | A1 | * | 1/2004 | Johnson .................. 713/189 |
| 2004/0111251 | A1 | * | 6/2004 | Trimmer et al. .......... 703/26 |
| 2004/0153614 | A1 | * | 8/2004 | Bitner et al. ............. 711/162 |

* cited by examiner

*Primary Examiner*—Stephen C. Elmore
(74) *Attorney, Agent, or Firm*—Charles J. Kulas; Trellis Intellectual Property Law Group, PC

(57) ABSTRACT

A method of accessing a plurality of storage devices is disclosed. A system and a computer program product for emulating tape libraries are also disclosed. First and second virtual storage devices with first and second address spaces, respectively, are defined. The first and second address spaces are mapped to portions on each of a plurality of storage devices. The storage devices can be part of a power managed RAID system where all the storage devices are not powered on at one time. A stream of contiguous address values are received and a storage device is selected. Finally, data is stored on the portion of the selected storage device so that multiple data streams can be written at all times, even though all the storage devices are not powered on. Similarly, stored data may be retrieved from the selected storage device by traversing the scattered streams.

22 Claims, 16 Drawing Sheets

| RAID set | | | | | | | |
|---|---|---|---|---|---|---|---|
| HD0 | HD1 | HD2 | HD3 | HD4 | HD5 | HD6 | HD7 |
| 0 to (n/7-1) | n/7 to (2n/7)-1 | 2n/7 to (3n/7)-1 | 3n/7 to (4n/7)-1 | 4n/7 to (5n/7)-1 | 5n/7 to (6n/7)-1 | 6n/7 to n-1 | Parity + metadata |

| RAID set | | | | | | | |
|---|---|---|---|---|---|---|---|
| HD0 | HD1 | HD2 | HD3 | HD4 | HD5 | HD6 | HD7 |
| VTC[0] | | | | | | | VTC[0] Parity |
| VTC[1] | | | | | | | VTC[1] Parity |
| VTC[2] | | | | | | | VTC[2] Parity |
| ----- | | | | | | | ----- |
| VTC[y-1] | | | | | | | VTC[y-1] Parity |

| HD0 | | | | | | |
|---|---|---|---|---|---|---|
| VTC[0]$_0$ Chunk 0 | VTC[1]$_0$ Chunk 0 | VTC[2]$_0$ Chunk 0 | ... | VTC[y-1]$_0$ Chunk 0 | VTC[0]$_1$ Chunk 1 | ... |
| LBA 0 to (x-1) | LBA x to 2x-1 | LBA 2x to 3x-1 | | LBA yx to (y+1)x-1 | LBA (y+1)x to (y+2)x-1 | |

FIG. 5

| HD0 | | | | |
|---|---|---|---|---|
| VTC[0]$_0$ All chunks | VTC[1]$_0$ All chunks | VTC[2]$_0$ All chunks | ... | VTC[y-1]$_0$ All chunks |
| LBA 0 to (x-1) | LBA x to 2x-1 | LBA 2x to 3x-1 | | LBA yx to (y+1)x-1 |

FIG. 6

| RAID set | | | | | | | |
|---|---|---|---|---|---|---|---|
| HD0 | HD1 | HD2 | HD3 | HD4 | HD5 | HD6 | HD7 |
| VTC[A] | | | | | | | VTC[A] Parity |
| VTC[B] | | | | | | | VTC[B] Parity |
| VTC[C] | | | | | | | VTC[C] Parity |
| ......... | | | | | | | ......... |
| VTC[G] | | | | | | | VTC[G] Parity |

| Stream Segment Record | |
|---|---|
| Field name | Description |
| StreamID | A stream unique identifier |
| DriveID | Unique identifier for a drive in the RAID set for this segment |
| InterleaveID | A unique ID for an interleave used by this segment |
| SegmentNumber | A monotonically increasing count of segments for this stream |
| StartingLogicalBlk | User data logical block that begins this segment |
| StartingPhysicalBlk | Starting physical data block on the HD |
| EndingLogicalBlk | User data logical block that ends this segment |
| EndingPhysicalBlk | Ending physical data block on the HD |

| Stream Master Record | |
|---|---|
| Field name | Values |
| StreamID | A stream unique identifier |
| RAIDSetID | Unique identifier for the RAID set for this stream |
| NumberOfInterleaves | A count of the interleaves used by this stream |
| InterleaveID_0 | A unique ID for the interleave used by this stream |
| InterleaveID_1 | A unique ID for the interleave used by this stream |
| ⋮ | ⋮ |
| InterleaveID_n | A unique ID for the interleave used by this stream |
| FirstSegmentHD | A monotonically increasing count of segments for this stream |
| FirstSegmentStartingBlk | Starting data block on the hard drive (BOD) |
| EODLogicalBlk | The last logical block of user data |
| LastSegmentHD | A monotonically increasing count of segments for this stream |
| LastSegmentEndingBlk | EOD data block on the hard drive |
| SegmentCount | Number of records to follow (x) |
| SegmentRecord_0 | |
| SegmentRecord_1 | |
| ⋮ | |
| SegmentRecord_x | |

FIG. 11

| Interleave Descriptor (fixed allocation) | |
|---|---|
| Field name | Description |
| InterleaveID | A unique ID for the interleave |
| StartingAddr | Physical address of first chunk in this interleave on each disk |
| Size | Physical block count for each interleave chunk |
| ChunkCount | Number of chunks on each disk |
| Interval | Physical block count between disks |

FIG. 12

| Interleave Descriptor (dynamic allocation) | |
| --- | --- |
| Field name | Description |
| InterleaveID | A unique ID for the interleave |
| StartingAddr | Physical address of first chunk in this interleave on each disk |
| ChunkCount | Number of chunks for this interleave (n) |
| ChunkDiskID_0 | Disk containing the chunk |
| ChunkStartAddr_0 | Chunk starting physical address on disk |
| ChunkEndAddr_0 | Chunk ending physical address on disk |
| ChunkDiskID_1 | Disk containing the chunk |
| ChunkStartAddr_1 | Chunk starting physical address on disk |
| ChunkEndAddr_1 | Chunk ending physical address on disk |
| ... | ... |
| ChunkDiskID_n | Disk containing the chunk |
| ChunkStartAddr_n | Chunk starting physical address on disk |
| ChunkEndAddr_n | Chunk ending physical address on disk |

FIG. 13

| Disk Descriptor | |
|---|---|
| Field name | Description |
| DiskID | Unique identifier for the drive in the RAID set |
| DiskAddress | Bus or interface address to the disk |

| RAID Set Stream Description | |
|---|---|
| Field name | Values |
| RAIDSetID | Unique identifier for the drive in the RAID set for this segment |
| TotalDisks | A count of the total number of disk descriptors |
| DiskDescriptor_0 | |
| DiskDescriptor_1 | |
| ⋮ | ⋮ |
| DiskDescriptor_n | |
| TotalInterleaves | A count of the total number of interleave descriptors |
| InterleaveDescriptor_0 | |
| InterleaveDescriptor_1 | |
| ⋮ | ⋮ |
| InterleaveDescriptor_n | A unique ID for the interleave used by this segment |
| StreamCount | Number of stream records to follow (x) |
| StreamRecord_0 | |
| StreamRecord_1 | |
| ⋮ | ⋮ |
| StreamRecord_x | |

FIG. 15

METHOD AND SYSTEM FOR ACCESSING A PLURALITY OF STORAGE DEVICES

CLAIM OF PRIORITY

This application claims priority from the following U.S. Provisional Patent Application, which is hereby incorporated by reference, as if it is set forth in full in this specification for all purposes:

U.S. Patent Application Ser. No. 60/524,678; "SYSTEM AND METHOD FOR PROVIDING VIRTUAL TAPE STORAGE AND A VIRTUAL TAPE CARTRIDGE USING INTERLEAVING," filed on Nov. 24, 2003 now abandoned.

CROSS-REFERENCE TO RELATED APPLICATION

This application is related to the following application, which is hereby incorporated by reference, as if it is set forth in full in this specification:

U.S. patent application Ser. No. 10/607,932, entitled "METHOD AND APPARATUS FOR POWER EFFICIENT HIGH-CAPACITY SCALABLE STORAGE SYSTEM," filed on Jun. 26, 2003 now U.S. Pat. No. 7,035,972.

BACKGROUND

The present invention relates generally to data storage systems. More specifically, the present invention relates to a method and system for the management of data in high-density data storage systems.

Data storage systems comprise storage devices such as hard-disk drives, floppy drives, tape drives, compact disks, etc. Conventionally, tape-based storage systems are used for storing large volumes of data including making "backups" of data for recovery purposes in case of a loss of the backed-up data. Though tape drives are an inexpensive way of backing up large amounts of data, they can be slow in speed. Further, tape-based storage systems do not offer sufficient protection against data corruption, user error and device failures while data are being written to or read from the tape. Even state-of-the-art tape-based storage technologies, such as the Linear Tape Open (LTO) and Super Digital Linear Tape (SDLT), are substantially slower than disk-based storage systems, such as a Redundant Array of Inexpensive/Independent Disks (RAID). RAID systems employ a combination of multiple disk drives for data storage, and allow redundancy of stored data, which ensures data integrity in the case of a disk failure. Recovery from a disk failure can also be automated within RAID systems, by using data redundancy and parity generation.

Replacing tape-based storage systems with disk-based storage systems can increase speed, improve reliability, and eliminate delays in loading and searching for a tape for the required data. However, this replacement requires new software and exhaustive redesigning of present computing systems and applications. In order to avoid this problem, virtual tape libraries (VTL) are used.

A VTL is a configuration or design that makes an array of disk drives, such as a RAID array, seem like a tape library to a computing system or application. This can be achieved with the minimum addition of new software to the computing system or minimum redesigning of the computing system. The tape library includes multiple tape drives. VTLs are fast and can be shared among multiple computing systems, such as multiple media servers, running different applications. Data may also be allocated disk space in a static or dynamic way in VTLs.

However, as the number of disk drives in RAID systems increase, power consumption becomes high since, to maintain fast random-access of a disk, each disk drive that might be needed has to be powered on in a constant and fast spinning state. Therefore, disk-based storage systems consume more power than tape-based ones with equal storage capacity. In addition, as the number of powered drives increases, the probability of the failure of a disk drive also goes up.

SUMMARY

In accordance with one embodiment of the present invention, a method for accessing a plurality of storage devices is provided. The method comprises defining first and second virtual storage devices having first and second address spaces, respectively. Each of these address spaces are mapped to a portion on each of the plurality of storage devices. The storage devices can be part of a power managed RAID system, in which all the storage devices are not powered on at one time. A stream of contiguous address values, corresponding to the plurality of storage devices, are then received. A storage device is selected from amongst the plurality of storage devices, according to the mapping of an address space to the portion of the storage device. An operation, such as data write/read corresponding to a data range is performed on the selected storage device. Data is stored on the portion of the selected storage device in such a way that multiple data streams can be written even though all the storage devices are not powered on. Similarly, stored data may be retrieved from the selected storage device by traversing the streams that are scattered in the plurality of storage devices.

In accordance with another embodiment of the present invention, a system for emulating a tape library is provided. The system comprises a plurality of disk drives arranged in a redundant array of independent/inexpensive disks. A machine-readable medium stores a definition of first and second virtual tape-storage devices with first and second address spaces, respectively, and mappings of first and second address spaces to portions on each of the plurality of disk drives. A processor receives a stream of contiguous address values corresponding to the plurality of storage devices. A machine-readable medium includes instructions executable by the processor for receiving the stream of contiguous address values and performing an operation, such as data write/read on a data range residing on a storage device. The storage device is selected according to the mapping of an address space to a portion of the storage device.

Various embodiments of the present invention provide a design for storing multiple data streams in a parallel arrangement in a plurality of disk drives. According to the design, each of the disk drives is divided into a plurality of address spaces or interleaves. A set of address spaces on a disk drive forms a portion of a virtual tape cartridge (VTC). There can be multiple such VTCs on each disk drive and a VTC can span the plurality of disk drives. Therefore, a portion of the VTC can be available on each disk drive, so that data can be stored in the VTC at any disk drive that is powered on. Subsequently, a continuous data stream is stored in a piecewise continuous manner, with a piece of the data stream being stored in the set of address spaces.

BRIEF DESCRIPTION OF THE DRAWINGS

Various embodiments of the invention will hereinafter be described in conjunction with the appended drawings, provided to illustrate and not to limit the invention, wherein like designations denote like elements, and in which:

FIG. 4 illustrates an arrangement of VTCs across hard disk drives in a RAID set, in accordance with an exemplary embodiment of the present invention;

FIG. 5 is a schematic representation of interleave addressing of the VTCs, in accordance with an embodiment of the present invention;

FIG. 6 is a schematic representation of interleave addressing of the VTCs, in accordance with another embodiment of the present invention;

FIG. 8 is a block diagram illustrating VTCs corresponding to dynamic allocation of data streams, in accordance with an embodiment of the present invention;

FIG. 10 depicts a table representing an exemplary stream segment record;

FIG. 11 depicts a table representing an exemplary stream master record;

FIG. 12 depicts a table representing an exemplary interleave descriptor with a fixed allocation;

FIG. 13 depicts a table representing an exemplary interleave descriptor with a dynamic allocation;

FIG. 14 depicts a table representing an exemplary disk descriptor; and

FIG. 15 depicts a table representing an exemplary RAID set stream descriptor.

DESCRIPTION OF THE VARIOUS EMBODIMENTS

The present invention relates to a method and system for storing data in a plurality of storage devices. In one embodiment of the present invention, the plurality of storage devices is part of a power managed redundant array of independent/inexpensive disks (RAID) system or a massive array of inactive/idle disks (MAID) system. In a power managed RAID system only a limited number of storage devices are powered on at a time. Power-managed RAID systems are described in U.S. patent application Ser. No. 10/607,932, entitled 'Method and Apparatus for Power Efficient High-Capacity Storage System', and filed on Sep. 03, 2002, which is incorporated herein by reference, now U.S. Pat. No. 7,035,972.

In an embodiment, the present invention provides a method and system for emulating tape libraries through virtual tape libraries (VTLs). The term emulating refers to the ability of a program or device to imitate another program or device. A tape library is a hardware device that contains a collection of tape drives. Each tape drive can mount a tape cartridge. A cartridge is a removable storage medium, such as a tape. A tape is a magnetically coated strip of plastic on which data can be encoded. Tapes are sequential-access media, i.e., to get to a particular point on the tape, preceding or trailing points on the tape generally must be traversed. In sequential-access media, all data is written in a sequential organization of monotonically increasing contiguous addresses. This sequential data is referred to as a data stream. Data insertion or replacement at random address locations is not permitted. In general, a tape library includes multiple tape drives for reading and writing data, access ports for entering and removing tapes, and a robotic device for mounting and dismounting the tape cartridges. Similarly, a VTL includes multiple virtual tape drives (VTDs) where each VTD can mount a virtual tape cartridge (VTC). In contrast, disks are a more random-access type of media. A disk drive can access any point much more quickly without necessarily passing through the intervening points. A disk drive reads data from and writes data to a disk. Examples of disk drives include floppy drives, hard-disk drives (HDs), optical storage disk drives, magneto-optic disk drives, etc. Although embodiments of the invention are described primarily with respect to HDs, any suitable type of storage system can be used.

Figure 16:
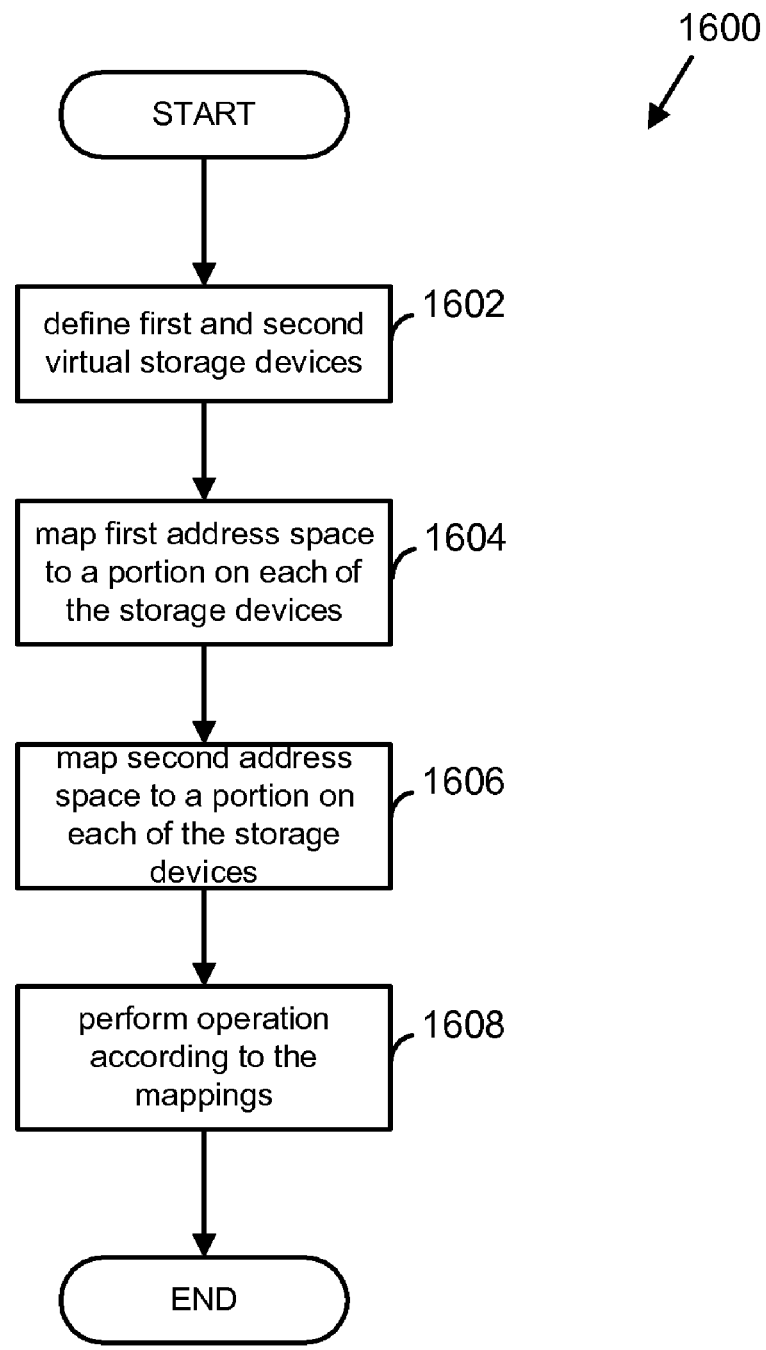
FIG. 16 depicts a flowchart representing an exemplary mapping of address spaces.

Flowchart 1600 of FIG. 16 illustrates an embodiment of the present invention. A method of accessing a plurality of storage devices comprises defining a first and a second virtual tape cartridge in the power managed RAID system with first and second address spaces, respectively, at step 1602. The first address space is mapped to a portion on each of a plurality of disk drives at step 1604. Similarly, the second address space is also mapped to a different portion on each of the plurality of disk drives at step 1606. A storage device is selected from amongst the plurality of storage devices to store a contiguous data stream. This selection is made on the basis of the mapping of address spaces to portions of storage devices. Similarly, stored data can be retrieved from the selected storage device on the basis of the mapping of address spaces to portions of the storage device. These operations are performed in accordance with the mappings as indicated by step 1608.

Figure 1:
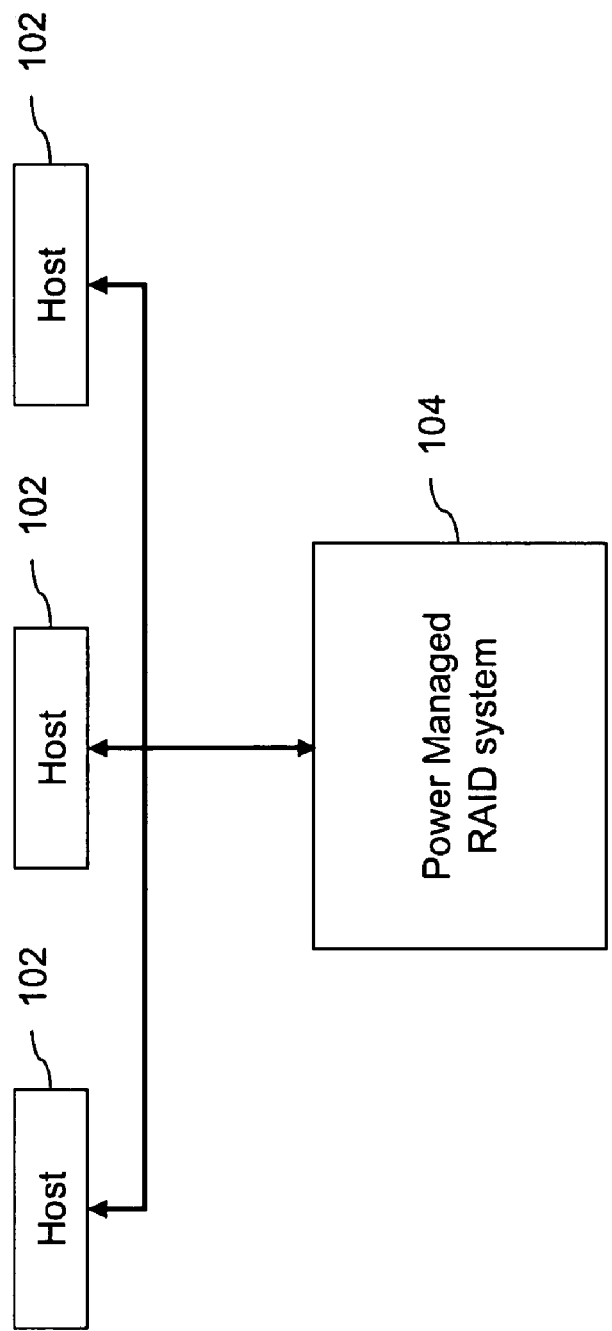
FIG. 1 is a block diagram illustrating a system suitable for data storage, in accordance with an exemplary embodiment of the present invention.

FIG. 1 is a block diagram illustrating a system suitable for data storage, in accordance with an exemplary embodiment of the present invention. The system includes one or more hosts 102. Examples of hosts 102 include devices such as computer servers, stand-alone desktop computers, and workstations. Various applications that require storage and access of data execute on hosts 102. Such applications carry out data read/write or data transfer operations. Hosts 102 are connected to a power managed RAID system 104 through a network such as a local area network (LAN).

Power managed RAID system 104 includes a large number of disk drives. In an embodiment of the present invention, the disk drives in power managed RAID system 104 present themselves as VTCs that are accessed through VTDs. For efficient use of power in a power managed RAID system 104, only the disk drives that are needed at a given time are powered on. By powering on a limited number of drives at any time, heat generation, and cost in power supply design and power distribution is reduced. The life of a disk drive is also extended. In another embodiment of the present invention, the disk drives may be independently addressable by the hosts, (i.e., presented as a disk instead of a VTL) where the host software maintains the interleave partitioning for parallel data streams.

Figure 2:
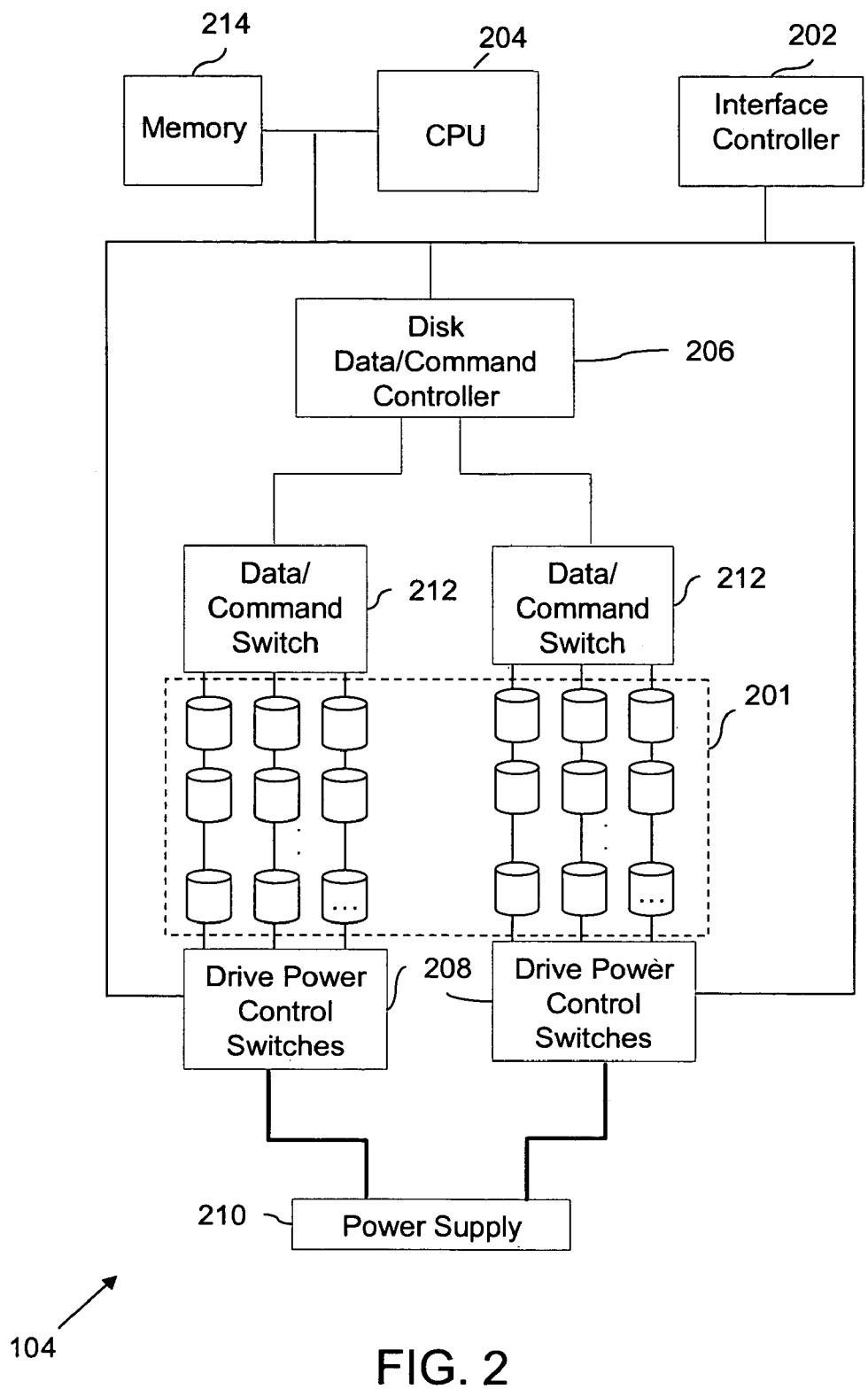
FIG. 2 is a block diagram illustrating an exemplary power managed redundant array of independent/inexpensive (RAID) system, in accordance with an embodiment of the present invention.

FIG. 2 is a block diagram illustrating an exemplary power managed RAID system 104. Power managed RAID system 104 comprises a plurality of disk drives 201 that include disks. Plurality of disk drives 201 store data and parity information regarding the stored data. Power managed RAID system 104 is designed in such a manner that it presents itself as a VTL to hosts 102. It includes an interface controller 202 for receiving data from hosts 102 that want to store data in power managed RAID system 104, as well as commands for storing or accessing data. Interface controller 202 can be any computer storage device interface, such as a target SCSI controller. On receiving data from hosts 102, interface controller 202 sends it to a central processing unit (CPU) 204, which calculates the parity of the data. CPU 204 controls power managed RAID system 104. It is responsible for management of power in power managed RAID system 104, and controls the routing of data to and from plurality of disk drives 201.

A disk/data command controller 206 acts as an interface between CPU and plurality of disk drives 201. Disk/data command controller 206 is connected to plurality of disk drives 201 through a communication bus, such as a SATA or SCSI bus. Data to be stored is sent by CPU 204 to plurality of disk drives 201 through disk/data command controller 206. Further, CPU 204 receives data from plurality of disk drives 201 through disk/data command controller 206. A series of drive power control switches 208 control the power supplied to the disk drives from a power supply 210. CPU 204 also controls a series of data/command multiplexing switches 212 through disk/data command controller 206 for selecting a disk drive that receives commands. CPU 204 receives a stream of contiguous addresses of plurality of disk drives 201 from disk/data command controller 206. The received stream of contiguous addresses of plurality of disk drives 201 is stored in a memory 214. Memory 214 can be, for example, a random access memory (RAM). CPU 204 maps these addresses to the address spaces described above, and identifies the disk drives that receive or supply data, based on the mappings. The mappings are also stored in memory 214 so that CPU 204 can access them.

In an exemplary embodiment of the present invention, plurality of disk drives 201 in power managed RAID system 104 can be arranged into a collection of RAID sets. Each RAID set is identified by a logical unit number (LUN), which refers to a unique identifier used on a communication bus to distinguish between devices that share the same communication bus. A RAID set further comprises eight disk drives. A disk drive in a RAID set has a storage capacity of, for example, 250 gigabytes (GB). Of these eight disk drives in the RAID set, seven contain data, and are referred to as data drives; and one disk drive contains parity information of the data in the seven data drives and is referred to as a parity drive. For generating parity information, an exclusive-OR (XOR) operation is performed on data stored across the seven data drives, and the corresponding values are stored in the parity drive. In case of failure of a data drive, the parity information is used to regenerate the data stored on the data drive. This is achieved by performing a XOR operation on the data stored in the other six data drives of the RAID set, and the parity information stored in the parity drive.

Only one data drive is powered on at any given time in the RAID set, according to an exemplary embodiment of the present invention. Therefore, the addresses of all the disk drives in the RAID set are not available at all times. In other words, the addresses of locations corresponding to only the data drive that is powered on are available at a time. Data can be stored in or retrieved from these locations.

Figure 3:
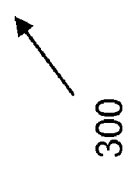
FIG. 3 is a schematic representation of an exemplary RAID set in a power managed RAID system, in accordance with an exemplary embodiment of the present invention.

FIG. 3 is a schematic representation of an exemplary RAID set 300 in power managed RAID system 104. RAID set 300 comprises eight disk drives. The disk drives in RAID set 300 can be identical hard-disk drives (HDs) HD0-HD7, with each HD having the same storage capacity. Of these, HD0-HD6 are data drives and HD7 is the parity drive. A data drive is divided into logic blocks, with each logic block having a size of 512 bytes. Each logic block is assigned an address, so that RAID set 300 is assigned a range of logic block addresses (LBAs) from 0 to n−1, where $$n = \frac{\text{capacity of a member } HD \text{ in bytes}}{512 \text{ bytes}} \times 7$$

These addresses are shared among data drives HD0-HD6, i.e., addresses 0 to (n/7−1) correspond to HD0, addresses n/7 to (2n/7−1) correspond to HD1, and so on. As mentioned above, only one data drive is powered on at any given time in RAID set 300. In such a case, an operation on data, such as writing, is performed on only one HD in RAID set 300. Therefore, only n/7 addresses corresponding to the HD that is powered-on or active are available at a time. In other words, there is a boundary after every n/7 addresses at which the active HD is powered down and a next hard drive is powered on. For the purpose of emulating a tape library where data is written contiguously in tape cartridges, RAID set 300 is divided into a plurality of VTCs, while maintaining only one active HD. Each VTC spans the data drives HD0-HD6, i.e., each VTC occupies some space in each of the data drives of RAID set 300.

FIG. 4 illustrates the arrangement of VTCs across HD0-HD6 in RAID set 300, in accordance with an embodiment of the present invention. There are 'y' such VTCs for HD0-HD6, namely VTC[0] to VTC[y−1], where y is an integer. Therefore, RAID set 300 can receive and store data for 'y' VTCs. Each VTC is assigned a number within square brackets, from [0] to [y−1]. HD7 stores the parity bits corresponding to VTC[0] to VTC[y−1]. Each VTC is divided into address spaces at regular intervals corresponding to the LBAs assigned to RAID set 300. In other words, each address space is mapped to a portion of the HDs in RAID set 300.

To separate storage space for each VTC, address spaces are mapped in an interleaving arrangement or in a noncontiguous way. This is because data is written sequentially in streams to the VTCs. Interleaving enables all the 'y' VTCs to be accessed for a data stream, irrespective of the data drives that are not powered on. In an embodiment of the present invention, the size and location of address spaces are predetermined and set by an administrator of power managed RAID system 104. In another embodiment of the present invention, an allocation algorithm determines the size and location of address spaces. The sizes and locations of address spaces may also be determined dynamically while writing to or reading from the HDs. The definition of the VTCs and the mapping of the address spaces to the various portions of the HDs are stored as metadata tables. This is explained later, in conjunction with FIG. 10 to FIG. 15. The definition of the VTCs includes tracking the locations of data streams that are written to or retrieved from the VTCs. A data stream refers to the contiguous or sequential flow of data received for storage. The data stream can be stored in any of the VTCs shown in FIG. 4. However, the VTC is spread across the data drives HD0-HD6, and only one HD is powered on at a time. To enable storage of the contiguous data stream in a VTC, in accordance with the non-contiguous arrangement of HDs in RAID set 300, the HDs are interleaved.

FIG. 5 is a schematic representation of interleave addressing of the VTCs, i.e., VTC[0], VTC[1] . . . , VTC[y-1], and so on, for HD0, in accordance with an embodiment of the present invention. For the purpose of interleaving, each VTC is divided into chunks of storage space in the HDs. For example, the portion of VTC[0] lying in HD0 is divided into chunks. Each chunk includes 'x' logic blocks corresponding to 'x' LBAs, where 'x' is an integer. The first chunks of each VTC (i.e., Chunk 0 of VTC[0], Chunk 0 of VTC[1], and so on) are stored in a sequential order. These are followed by the second chunks of each VTC (i.e., Chunk 1 of VTC[0], Chunk 1 of VTC[1], and so on). Chunk 0 of VTC[0] in HD0, i.e., VTC[0]$_0$ is assigned LBAs from 0 to x−1, Chunk 0 of VTC[1]$_0$ is assigned LBAs from 'x' to '2x−1', and so on. This arrangement is repeated throughout HD0, so that an interleave repeats itself after every chunk, i.e., a chunk represents an interleave section. The interleave sections are scattered across HD0, i.e., there are multiple interleave sections for each VTC in HD0. This arrangement reduces the seek time of the HD while accessing multiple VTCs. For example, when two data streams are to be simultaneously written to VTC[0] and VTC[2], the write operation can begin at a logic block in Chunk 0 of VTC[0]$_0$ and a logic block in Chunk 0 of VTC[2]$_0$ respectively. In this case, the seek time between accessing the two logic blocks is small as they are placed close together. Therefore, the interleave addressing shown in FIG. 5 enables fast access of data. Similarly, the VTCs are interleaved in other data drives for the assigned range of LBAs.

FIG. 6 is a schematic representation of interleave addressing of the VTCs for HD0, in accordance with another embodiment of the present invention. Here, HD0 is divided into sections of equal size. In HD0, all the VTC[0]$_0$ chunks are placed together, resulting in a section, followed by all the VTC[1]$_0$ chunks, and so on. There is a section for each VTC in HD0. The size of each section is a multiple of the chunk size. In an exemplary embodiment of the present invention, each section includes 'x' logic blocks. Similarly, the VTCs are interleaved in other data drives.

In the exemplary embodiments described in conjunction with FIG. 5 and FIG. 6, there is one tape partition for every VTC. In accordance with another embodiment of the present invention, multiple tape partitions can be created in one VTC. These multiple tape partitions emulate tape technologies that allow multiple data partitions in a single tape cartridge. Each tape partition is individually addressable from a logical address zero and increasing monotonically up to the total capacity of the tape partition. For creating multiple tape partitions in a single VTC, each tape partition is assigned its own interleave and is handled analogously to an independent VTC.

In an embodiment of the present invention, a VTC can span several RAID sets depending on the data storage requirement. In another embodiment of the present invention, the mappings as mentioned earlier, may correspond to address spaces of variable sizes. Interleave addressing may be achieved by several other designs or arrangements in RAID set 300 and is not limited to the two designs shown in FIG. 5 and FIG. 6, and only the embodiments described above.

The interleave addressing designs are used to write data to or retrieve data from RAID set 300, in accordance with an embodiment of the present invention. In RAID set 300, the parity drive is also divided into chunks. Each VTC (that spans across all data drives) has its own parity because parity chunks in HD7 will be at the same interval as VTC data chunks. This allows overwrite operation on a VTC, without affecting other VTCs in the HD. Multiple streams of data may be processed. Data is written to an HD for different VTCs at different times. In case HD0 is powered down during a data write operation, data writing can begin at chunk 0 of a VTC on a drive other than HD0. In an embodiment of the present invention, the method for accessing a plurality of HDs comprises defining first and second VTCs from amongst the 'y' VTCS shown in FIG. 4. Each of the first and second VTCs have a corresponding address space, namely the first address space and the second address space, respectively. The first address space is mapped to a portion on each of the plurality of HDs; the second address space is mapped to a different portion on each of the plurality of HDs. This mapping can be achieved by using any one of the interleaving arrangements described above. A stream of contiguous address values for the address spaces is received from CPU 204, shown in FIG. 2. Finally, data is written to or retrieved from a HD according to the mapping of the address spaces to portions of a selected HD.

Figure 7:
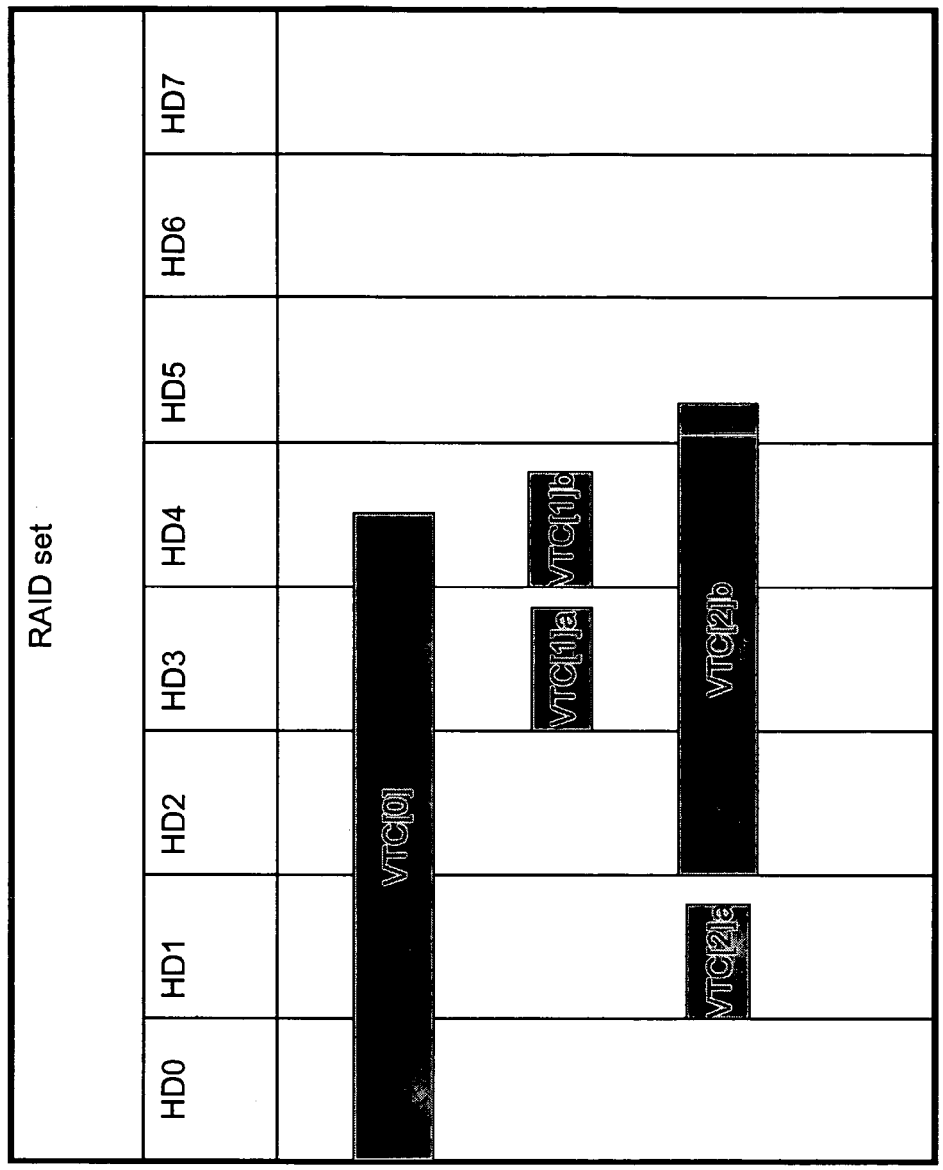
FIG. 7 is a block diagram illustrating an exemplary write operation, in accordance with an embodiment of the present invention.

FIG. 7 is a diagram illustrating an exemplary write operation, based on any of the interleaving arrangements shown in FIG. 5 and FIG. 6, in accordance with an embodiment of the present invention. In FIG. 7, data is written from left to right in a VTC. Initially, a data stream sent to RAID set 300 is written on a first VTC, i.e., a VTC[0]. This fills the interleave chunks or address spaces on HD0, which is then shut down; and the data stream is continued on VTC[0] in HD1, which is powered on. During the HD1 write, a second stream of data is received for a second VTC. The second VTC can be any VTC in HD1, other than VTC[0], for example, VTC[2]. When the data stream on VTC[0] completes its allocated space in HD1, both the streams on VTC[0] and VTC[2] are continued in HD2 even though the address space for VTC[2] is not utilized completely. Data for another stream (for example, VTC[1]), starts getting stored while data for VTC[0] and VTC[2] is being written in HD3. All the three streams in VTC[1], VTC[2], VTC[3] are continued in HD4, when HD3 is shut down. This process is repeated as additional streams are added. Therefore, data streams are stored in the VTCs in a piece-wise continuous manner, where each piece of the data stream is stored in a particular HD. It is to be noted that the data is stored in parallel streams in the VTCs in any order, i.e., the VTCs are not selected on the basis of a VTC number for storing data.

As described above, a VTC may have one or more tape partitions. Each tape partition of a VTC emulates a logical location defined with the help of a beginning of partition (BOP) where the data stream for that tape partition begins, and an end-of-partition (EOP) where the available logic blocks for the tape partition have been exhausted and the VTC tape partition is considered full. No additional data can be written to a VTC tape partition once the tape partition is full, unless data stored in the tape partition is overwritten from BOP or erased. A point on the tape partition, such as VTC[1]*a* (as shown in FIG. 7), on which a data stream begins, is known as beginning-of-data (BOD), and is always coincident with BOP. Similarly, a point on the tape partition, such as VTC[1]*b*, on which a last data segment is stored, is known as end-of-data (EOD). BOD and EOD are defined for every VTC. The physical locations of BOD and EOD are not fixed and can be on any of the interleaves assigned to the corresponding VTC. Further, data segments can be stored in any order in the HDs of RAID set 300. However, data segments for all the tape partitions of one VTC are always stored in the interleaves allocated to the VTC. For example, data segments for a tape partition of VTC[1] can begin in any HD of RAID set 300, but the data segments will always be in the interleaves allocated for VTC[1] in each HD of RAID set 300.

In another embodiment of the present invention, data streams are allocated dynamically to VTCs in different HDs. FIG. 8 is a block diagram illustrating VTCs corresponding to dynamic allocation of data streams. The VTCs may be initially interleaved or mapped, using any of the interleave designs described above. The mapping is performed at the time of initialization of the VTL. However, when a data stream is sent, VTC[A], VTC[B] and other VTCs can be assigned any number, depending on the availability of space and the drive that is active currently. In other words, A, B, ..., G are assigned a VTC number corresponding to an active hard drive with available storage space. Once a VTC is erased or an overwrite operation from BOP is initiated, the interleave corresponding to that VTC is freed, and the process is repeated by using metadata. The freeing of interleaves is registered in metadata. The interleave can sequentially span several RAID sets, if it is required that all the available groups in a "shelf" (or other subset) of power managed RAID system 104 are covered, or larger VTC capacities are provided while supplying a particular number of VTCs. It is also possible that more than one interleave line is assigned to a particular VTC, to provide additional capacity or improve the odds of having writeable space or readable data on a currently active HD.

Figure 9:
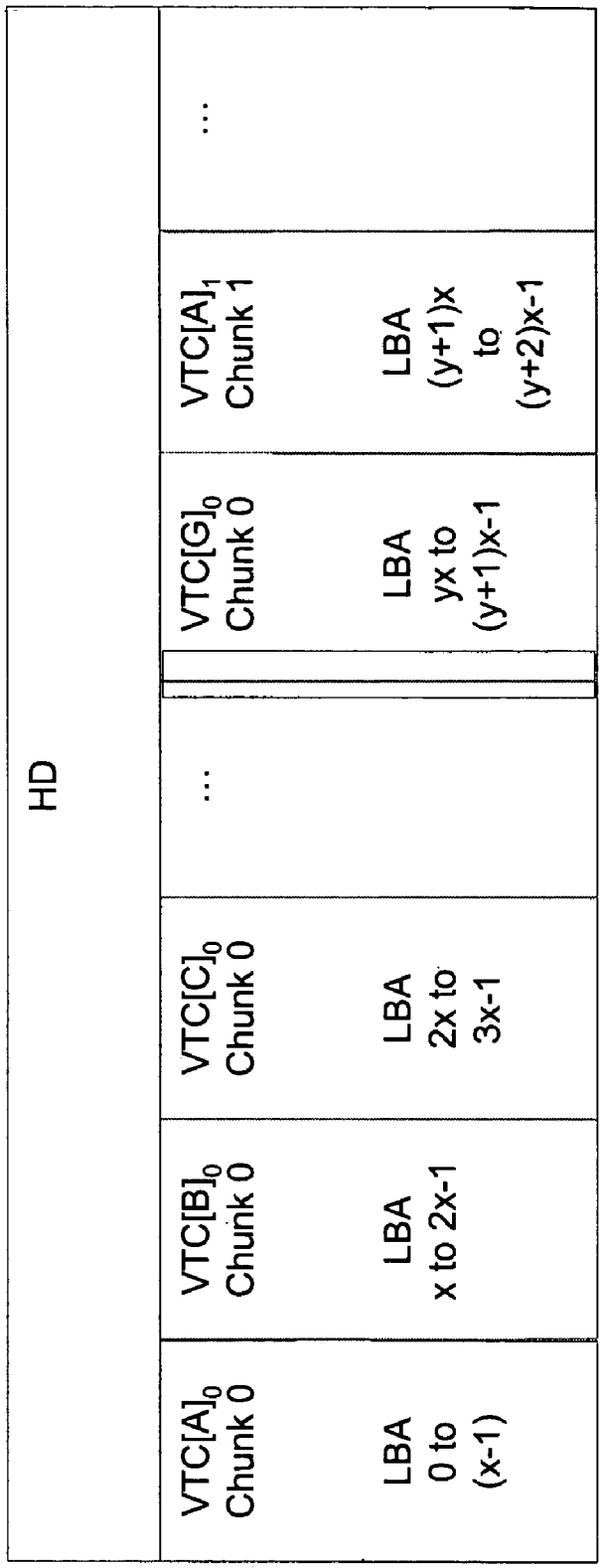
FIG. 9 is a schematic representation of interleave addressing of VTCs corresponding to dynamic allocation of data streams.

FIG. 9 is a schematic representation illustrating interleave addressing of VTCs corresponding to dynamic allocation of data streams, i.e., VTC[A], VTC[B], ..., VTC[G] for HD0. Software running on processor 116 assigns requests for new VTCs to an available RAID set or a RAID set with the lowest power consumption (i.e., with the minimum number of actively spinning disks) in a power managed RAID system 104. The software also assigns requests for new virtual tapes to another RAID set, based on the number of operating VTCs, to a shelf (i.e., selecting the shelf with the minimum number of operating VTCs). These assignments are tracked in a metadata. In another embodiment of the present invention, the assignment of a VTC depends on the load-balancing requirements of the power managed RAID system 104 at the time a new virtual tape is written from BOP.

As mentioned earlier, metadata is used while performing data read/write operations on a data range on the hard-disks. Metadata is used to store a definition of the first and second VTCs, mapping address spaces to HDs. Metadata records are used to track the locations of the data stream tape partitions within RAID set 300. Metadata also stores the stream of contiguous address values used by software running on processor 116. The metadata may be stored on the disks in areas outside the allocated interleaves and accessed through the disk controllers, or it may be stored in some other non-volatile memory locations accessible by processor 116. During write operations, the metadata is updated to allow the tracking of logical blocks of user data, as they map to HD address locations. During read operations, metadata allows the retrieval of data from a logical block. Metadata also keeps track of the next drive that needs to be powered on during operations. Drives may be powered on shortly before being accessed, to allow uninterrupted-data streaming.

In an embodiment of the present invention, the metadata comprises records of head and tail pointers for each contiguous data segment. The metadata can be stored in a number of locations, depending on the system design. It can be stored in a non-volatile flash memory, or in a reserved area of the RAID set 300, or in both. In an exemplary embodiment of the present invention, metadata is stored in the parity drives of the HDs in RAID set 300. This is because the parity drives are always powered on during write operations. The metadata can be a record stored at a predetermined location, or it may be divided into portions and stored in HDs.

FIG. 10 depicts a table representing an exemplary data structure for a stream segment record 1002. Stream segment record 1002 defines the physical addresses of an HD in which a particular contiguous segment of the stream of data is stored.

FIG. 11 depicts a table representing an exemplary data structure for a stream master record 1102, which exists for each stream. Stream master record 1102 contains information that is pertinent to a stream and a list of stream segment records, defining the segments in which the stream is stored. Stream master record 1102 also tracks the location of the start of the stream at BOD, and the end of the stream at EOD, and so forth.

FIG. 12 depicts a table representing an exemplary data structure for an interleave descriptor 1202 with fixed allocation. Interleave descriptor 1202 defines interleaves of fixed sizes on each disk, as described earlier in conjunction with FIG. 5.

FIG. 13 depicts a table representing an exemplary data structure for an interleave descriptor 1302 with dynamic allocation. Interleave descriptor 1302 comprises detailed records of each of the interleave locations, in which VTCs are stored, as described earlier in conjunction with FIG. 9. This allows flexible disk-space allocation. For example, the interleave sizes can be varied if one data stream is smaller than another.

FIG. 14 depicts a table representing an exemplary data structure for a disk descriptor 1402. Disk descriptor 1402 associates an addressable bus interface with the identity of a disk.

FIG. 15 depicts a table representing an exemplary data structure for a RAID set stream descriptor 1502. RAID set stream descriptor 1502 defines the characteristics of the interleaves and comprises a list of stream master records 1102.

The embodiments of the present invention have the advantage that they can emulate large tape libraries with efficient power management by creating VTLs. The VTLs so created emulate tape libraries, which may contain over 1000 tape cartridges with about 80 GB to 320 GB compressed capacity per cartridge and up to 64 tape drives. These VTLs contain a similar number of storage elements and have similar sizes with respect to the tape libraries mentioned above. Therefore, the VTLs can be integrated with data storage systems without changing existing policies and procedures, or adding new software.

The interleave arrangement allows a large number of data streams to be stored. In this arrangement, the maximum number of data streams that can be stored are not limited to the number of disk drives that are powered on in power managed RAID system 104 at any time. The interleave arrangement also allows emulation of a large number of VTDs, allowing storage of a large number of data streams simultaneously.

Although the embodiments of the present invention have been described in terms of interleave addressing for tape emulation in a power-managed RAID array, the method of the present invention is not limited to virtual representations of VTLs, and can be applied to storage or retrieval of any set of parallel data streams by considering the maximum number of streams at the time of the interleave allocation. Other embodiments of the present invention can use any configuration, arrangement or other scheme for accessing storage devices including non-power managed and non-RAID arrangements.

Specific groupings or organization of components and data can vary in different embodiments. For example, terms such as "cartridge," "shelf," "rack," "library," etc. are used in reference to general tape and/or RAID storage systems concepts and are not limiting of the scope of the invention. Although a preferred embodiment of the invention allows data to be obtained from any of a set of RAID HDs, other embodiments may impose restrictions on the availability of the data and may not provide all data on every HD. In some embodiments it may be desirable to implement less than an entire tape library as a virtual tape library, or to emulate less than an entire storage system or subsystem as a virtual storage system.

Aspects of the invention may be used to provide additional benefits other than those specifically presented herein. For example, it may be undesirable to access a specific storage unit for other than power considerations, e.g., due to bandwidth, latency, load-balancing or other considerations. In such an application, rules or criteria can be predefined to allow the system to automatically obtain data from a preferred storage unit.

Further, embodiments of the present invention can be used for storing any parallel data streams, and not just parallel data streams for storage in VTCs. Examples of parallel data streams that can be stored include video streams, streams from satellite downlinks, and data logging streams.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

Although the invention has been described with respect to specific embodiments thereof, these embodiments are descriptive and not restrictive of the invention. For example, it should be apparent that the specific values and ranges of parameters could vary from those described herein.

Although terms such as 'storage device,' 'disk drive,' etc., are used, any type of storage unit can be adapted for use with the present invention. Any of various present or future storage technologies such as solid state, magnetic, optical, magneto-optic, nano-engineered, microelectromechanical systems (MEMS), quantum, biological, bioelectric, etc. can be used.

Storage units can be located either internally inside a computer or outside it in a separate housing that is connected to the computer. Storage units, controllers, and other components of systems discussed herein can be included at a single location or separated at different locations. Such components can be interconnected by any suitable means, such as networks, communication links, or other technology. Although specific functionality may be discussed as operating at, or residing in or with, specific places and times, in general, it can be provided at different locations and times. For example, functionality such as data protection steps can be provided at different tiers of a hierarchical controller. Any type of RAID arrangement or configuration can be used.

In the description herein, numerous specific details are provided, such as examples of components and/or methods, to provide a thorough understanding of the embodiments of the present invention. One skilled in the relevant art will recognize, however, that an embodiment of the invention can be practiced without one or more of the specific details; or with other apparatus, systems, assemblies, methods, components, materials, parts, and/or the like. In other instances, well-known structures, materials, or operations are not specifically shown or described in detail, to avoid obscuring aspects of the embodiments of the present invention.

A 'processor' or 'process' includes any human, hardware and/or software system, mechanism, or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in 'real time,' 'offline,' in a 'batch mode,' etc. Moreover, certain portions of processing can be performed at different times and at different locations, by different (or the same) processing systems.

Reference throughout this specification to 'one embodiment', 'an embodiment', or 'a specific embodiment' means that a particular feature, structure or characteristic, described in connection with the embodiment, is included in at least one embodiment of the present invention and not necessarily in all the embodiments. Therefore, the use of these phrases in various places-throughout the specification does not imply that they are necessarily referring to the same embodiment. Further, the particular features, structures, or characteristics of any specific embodiment of the present invention may be combined in any suitable manner with one or more other embodiments. It is to be understood that other variations and modifications of the embodiments of the present invention, described and illustrated herein, are possible in light of the teachings herein, and are to be considered as a part of the spirit and scope of the present invention.

It will also be appreciated that one or more of the elements depicted in the drawings/figures can also be implemented in a more separated or integrated manner, or even removed or rendered as inoperable in certain cases, as is required, in accordance with a particular application. It is also within the spirit and scope of the present invention to implement a program or code that can be stored in a machine-readable medium, to permit a computer to perform any of the methods described above.

Additionally, any signal arrows in the drawings/figures should be considered only as exemplary, and not limiting, unless otherwise specifically noted. Further, the term 'or', as used herein, is generally intended to mean 'and/or' unless otherwise indicated. Combinations of the components or steps will also be considered as being noted, where terminology is foreseen as rendering unclear the ability to separate or combine.

As used in the description herein and throughout the claims that follow, 'a', 'an', and 'the' includes plural references unless the context clearly dictates otherwise. In addition, as used in the description herein and throughout the claims that follow, the meaning of 'in' includes 'in' and 'on', unless the context clearly dictates otherwise.

The foregoing description of the illustrated embodiments of the present invention, including what is described in the Abstract, is not intended to be exhaustive or limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention, in light of the foregoing description of the illustrated embodiments of the present invention, and are to be included within the spirit and scope of the present invention.

Therefore, while the present invention has been described herein with reference to the particular embodiments thereof, latitude of modification, various changes, and substitutions are intended in the foregoing disclosures. It will be appreciated that in some instances some features of the embodiments of the invention will be employed without the corresponding use of the other features, without departing from the scope and spirit of the invention, as set forth. Therefore, many modifications may be made, to adapt a particular situation or material to the essential scope and spirit of the present invention. It is intended that the invention is not limited to the particular terms used in the following claims and/or to the particular embodiment disclosed as the best mode contemplated for implementing the invention, which may include any and all the embodiments and equivalents falling within the scope of the appended claims.

What is claimed is:

1. A method for accessing a plurality of storage devices, the method comprising
    defining first and second virtual storage devices having first and second address spaces, respectively;
    mapping the first address space to a portion on each of the plurality of storage devices;
    mapping the second address space to a portion on each of the plurality of storage devices;
    receiving a stream of contiguous address values; and
    performing an operation on a data range on a storage device according to the mapping of an address space to a portion of a selected storage device, wherein the data range resides on the selected storage device.

2. The method of claim 1, wherein the first and second virtual storage devices include virtual tape cartridges.

3. The method of claim 1, wherein the plurality of storage devices comprises a redundant array of independent disks.

4. The method of claim 3, wherein the redundant array of independent disks is power-managed so that less than all of the plurality of storage devices is powered on.

5. The method of claim 4, further comprising
    selecting a mapping of an address space such that the operation is performed on data on a storage device that is powered on.

6. The method of claim 1, further comprising
    mapping address space in an interleave arrangement.

7. The method of claim 1, wherein multiple streams are processed.

8. The method of claim 1, wherein mapping is performed at a time of initialization of the plurality of storage devices.

9. The method of claim 1, further comprising
    using a metadata record to indicate a mapping.

10. The method of claim 9, wherein a metadata record includes a head and tail pointer to a segment on a storage device.

11. The method of claim 9, wherein a mapped portion on a storage device is a fixed size.

12. The method of claim 1, wherein a plurality of streams are processed, the method further comprising
    defining a master record for a stream including one or more of: stream start, stream end.

13. The method of claim 1, wherein the virtual storage devices comprise a virtual storage system.

14. The method of claim 13, wherein multiple virtual storage systems are used.

15. A system for emulating a tape library, the system comprising
    a plurality of disk drives arranged in a redundant array of independent disks;
    a machine-readable medium including:
    a stored definition of first and second virtual tape storage devices having first and second address spaces, respectively;
    a stored mapping of a first address space to a portion on each of the plurality of disk drives;
    a stored mapping of a second address space to a portion on each of the plurality of disk drives;
    a processor for receiving a stream of contiguous address values;
    a machine-readable medium including instructions executable by the processor for
    receiving a stream of contiguous address values; and
    performing an operation on a data range on a storage device according to the mapping of an address space to a portion of a selected storage device, wherein the data range resides on the selected storage device.

16. The system of claim 15, wherein the redundant array of independent disks is power-managed so that less than all of the disk drives in the array are powered on.

17. The system of claim 16, further comprising:
    selecting a mapping of an address space such that the operation is performed on data on a disk drive that is powered on.

18. A machine-readable medium including instructions executable by a processor for accessing a plurality of storage devices, the machine-readable medium including:
    one or more instructions for defining first and second virtual storage devices having first and second address spaces, respectively;
    one or more instructions for mapping the first address space to a portion on each of the plurality of storage devices;
    one or more instructions for mapping the second address space to a portion on each of the plurality of storage devices;
    one or more instructions for receiving a stream of contiguous address values; and
    one or more instructions for performing an operation on a data range on a storage device according to the mapping of an address space to a portion of a selected storage device, wherein the data range resides on the selected storage device.

19. The machine readable medium of claim 18, wherein the first and second virtual storage devices include virtual tape cartridges.

20. The machine readable medium of claim 18, wherein the plurality of storage devices comprises a redundant array of independent disks.

21. The machine readable medium of claim 18, further comprising
    mapping address spaces in an interleave arrangement.

22. The machine readable medium of claim 18, wherein the plurality of storage devices include disk drives arranged in a power-managed redundant array of independent disk drives.

* * * * *